Dec. 19, 1944. O. STORZ 2,365,154
ANTIFRICTION BEARING
Filed Jan. 29, 1943 2 Sheets-Sheet 1
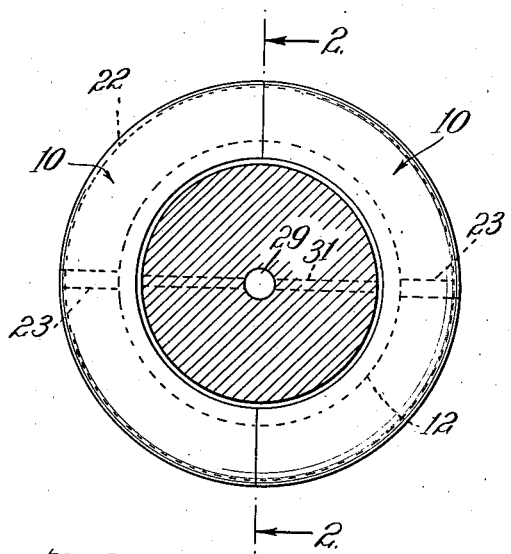
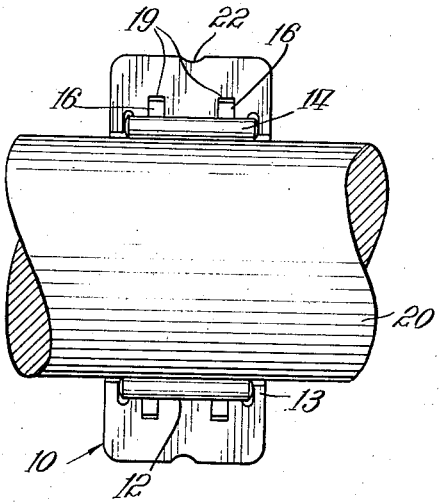
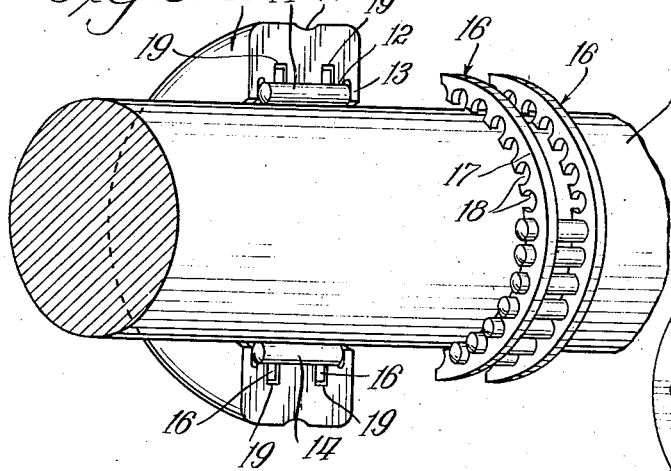
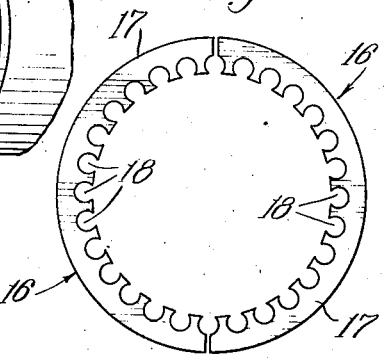
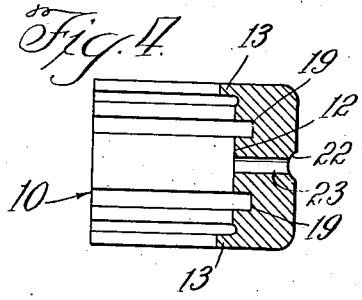
Inventor
Otto Storz
By: Foorman L. Mueller
Atty.

Dec. 19, 1944.     O. STORZ     2,365,154
ANTIFRICTION BEARING
Filed Jan. 29, 1943     2 Sheets-Sheet 2
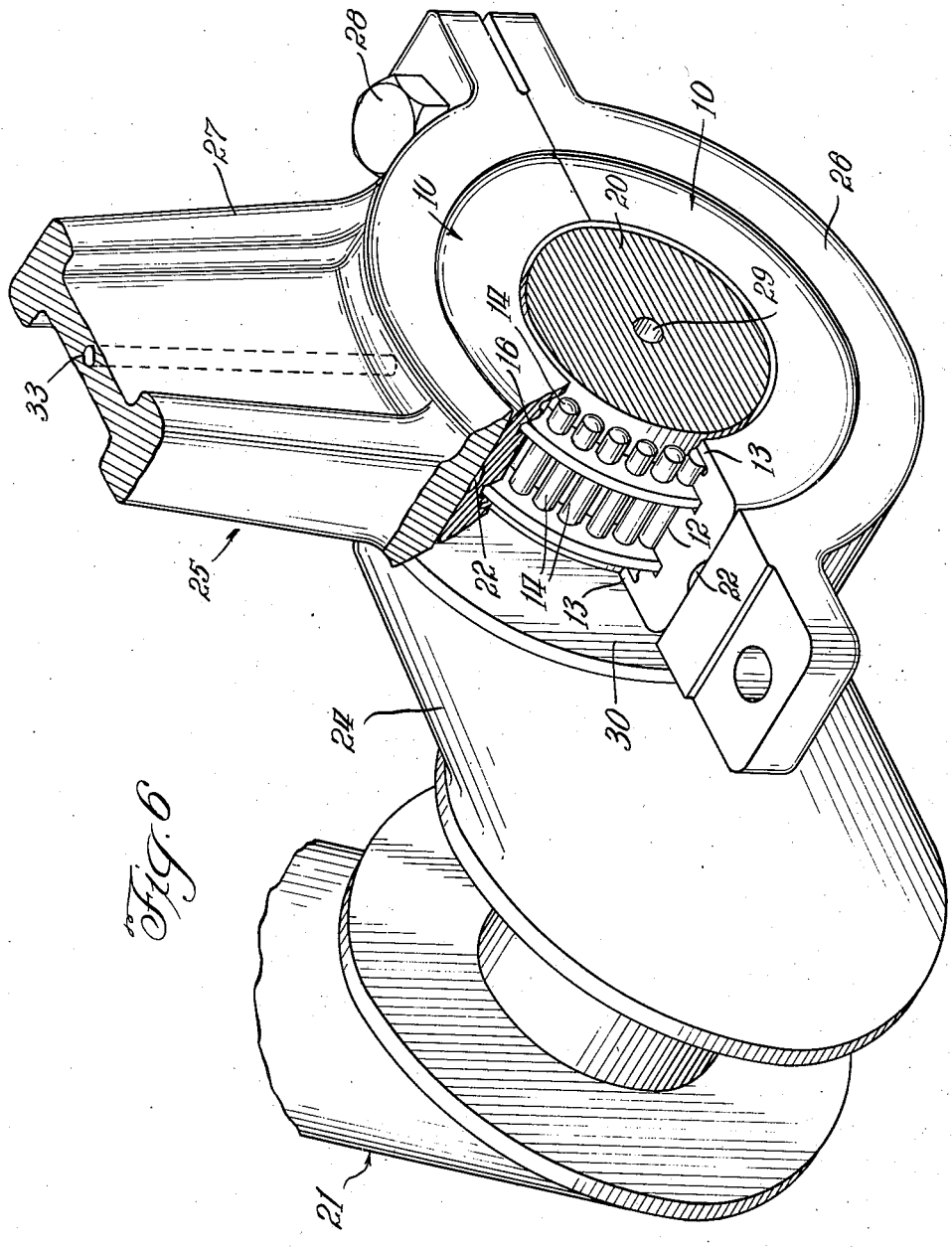
Inventor:
Otto Storz Patented Dec. 19, 1944

2,365,154

UNITED STATES PATENT OFFICE 2,365,154

ANTIFRICTION BEARING

Otto Storz, Valparaiso, Ind., assignor to McGill Manufacturing Company, Valparaiso, Ind., a corporation of Indiana Application January 29, 1943, Serial No. 473,899

1 Claim. (Cl. 308—179)

This invention relates generally to bearings and in particular to antifriction roller bearings of split type.

Split bearings have their application on line shafts, crank shafts and the like, where a full ring bearing can not be slipped over the end of the shaft due to a configuration in the shaft over its length or to devices on the shaft which interrupt the straight line surface of the shaft. Split bearings now generally used are of ball bearing and friction type. The split ball bearings are generaly unsatisfactory because the ball bearings, due to their round configuration, are in substantial point contact with their associated bearing surfaces so that their load carrying capacity is appreciably restricted. Further restrictions on any wide application of split ball bearings arise by virtue of their bulk which prevents their use where space limitations must be considered. Also these bearings are assembled only with difficulty and considerable inconvenience to provide a properly positioned raceway for the ball bearings. Although a split friction bearing has a high load carrying capacity it has the disadvantage of excessive heating at high speeds to an extent which destroys the bearing lubricant and oftentimes burns out the bearing. Since the bearing portion of the friction bearing is usually composed of a soft metal sleeve portion, this sleeve portion wears out rather quickly, particularly when overheated, so as to require frequent replacing. Friction bearings are thus limited in application to relatively slow speed operation.

In roller or needle bearings generally there is included an outer raceway in which the rollers are assembled in an adjacent parallel relation and confined at their ends by suitable thrust portions. The rollers have one side in bearing engagement with the inner peripheral surface of the outer raceway and an opposite side in bearing engagement with an inner raceway which is normally a shaft or the like. Because of the relatively long length of a roller with respect to its diameter a large load carrying capacity is obtained with a compact and relatively small bearing structure so that a roller bearing is readily adapted for heavy duty operation in a confined space. In the operation of these bearings the rollers tend to wedge or skew under certain conditions and oftentimes the twisting of the roller out of parallel alignment with adjacent rollers results in a freezing of the rollers against rotation. This twisting action of the rollers occurs most frequently when the bearing is operated at high speeds and has put definite limitations on the speed of operation of those moving parts supported by or acting on the roller bearings. In split roller bearings the tendency of a roller to twist is increased because of the difficulties encountered in precisely aligning the bearing parts. Also due to the long bearing surfaces on the rollers and their relatively enclosed position within the bearing structures difficulties have arisen in satisfactorily lubricating the rollers to provide for their long life operation over a wide range of speeds. As a result of these difficulties the use of split roller bearings commercially has been very limited and has been generally considered to be impractical.

It is an object of this invention, therefore, to provide an improved antifriction roller bearing of split type.

A further object of this invention is to provide an antifriction bearing of split type having a high load bearing capacity and capable of operating at high speeds over a long service life.

Another object of this invention is to provide an antifriction bearing in which the rollers are maintained in a spaced parallel relation against any skewing or twisting action at high speeds.

Yet another object of this invention is to provide an antifriction bearing of split type which is compact, comprised of but a few parts which are easily and quickly assembled in precision alignment, operates efficiently over a long service life, and is flexible in application to a large number of uses.

A feature of this invention is found in the provision of an antifriction bearing of split type having rollers associated with angularly movable retaining rings which are self-aligning relative to each other to provide for the rollers always being in a spaced parallel relation.

Yet another feature of this invention is found in the provision of an antifriction bearing including an outer raceway and roller bearings having retaining rings guidably supported for relative angular movement in annular guideways formed in the inner peripheral surface of the outer raceway. The guideways are connected with oil passages in the outer raceway and form oil reservoirs within the outer raceway from which the oil is moved by the retaining rings about the rollers and outwardly from the bearing.

Further objects, features, and advantages of this invention will become apparent from the following description when taken in connection with the accompanying drawings in which:

Fig. 1 is a side elevational view of the bearing of this invention;

Fig. 2 is a transverse sectional view taken along the line 2—2 in Fig. 1;

Fig. 3 is a partially exploded view in perspective of the bearing of this invention, with one of the outer raceway half portions not shown so as to more clearly illustrate the relative assembly of the bearing parts;

Fig. 4 is a transverse sectional view through one of the half portions of the outer raceway;

Fig. 5 shows the assembly of a split retaining ring for the bearing rollers; and Fig. 6 is a view in perspective showing the bearing of this invention in assembly relation with a connecting rod and associated crank shaft.

With reference to Figs. 1 and 2 the bearing of this invention is seen to include a pair of like outer raceway half portions 10 of semicircular shape adapted for mating end to end engagement to form a complete outer raceway. This outer raceway has an annular recess 12 in its inner peripheral surface with a bottom and side walls 13, a side wall 13 being at each end of the outer raceway (Figs. 3 and 4). The recess 12 is of a width to receive roller bearings 14 of a straight form over their entire length, with the opposite ends of each roller being adjacent the side walls 13 which function as thrust portions or bearings for the rollers. The rollers are maintained in a spaced parallel relation within the recess 12 by retaining rings 16 each of which is comprised of a pair of mating half portions (Fig. 5).

When a retaining ring 16 is assembled, as shown in Fig. 5, it is seen to include a continuous outer peripheral portion 17 and an inner peripheral portion having a series of arcuately shaped notches or holes 18 each of which is open at the inner side of the retaining ring. Each outer peripheral portion 17 is received in a corresponding annular guideway 19 formed in the bottom of the recess 12 to guidably support the retaining ring for angular movement within the outer raceway. With an outer peripheral portion 17 positioned within a corresponding guideway 19 a corresponding inner peripheral portion is located within the recess 12 and substantially within the peripheral confines of the side walls 13. The rollers 14 are inserted in corresponding holes 18 in the retaining rings 16 with one side of each roler being in bearing engagement with the bottom of the recess 12. An inner raceway, illustrated as a bearing portion 20 in a crank 24 of a crankshaft 21 (Figs. 1 and 6), is receivable within the outer raceway for bearing engagement with an opposite side of each roller.

The assembly of the bearing for one application thereof in a connecting rod bearing is shown in Figs. 3 and 6. Rollers 14 and corresponding half portions of the retaining rings 16 are assembled together and this assembly is positioned within a corresponding half portion 10 of the outer raceway. This half bearing assembly comprising an outer raceway portion 10, a pair of retaining ring halves and a corresponding rollers 14 is then placed within the cap or lower part 26 of the connetcing rod 25, with this complete assembly moved as a unit between adjacent cheeks of the crank throw 24 to receive the bearing portion 20 in the assembled half of the split bearing of this invention. The other half-bearing assembly which is assembled similarly to the first half-bearing assembly is positioned on the bearing portion 20 in mating relation with the first half-bearing assembly and the upper half 27 of the connecting rod 25 is then placed thereon. On securing the upper rod portion 27 with the cap 26, as by bolts 28, the assembly of the entire split bearing is completed with the two half-bearing assemblies being retained in lateral alignment by engaging portions 30 on the cheeks of the crank 24.

It is seen, therefore, that each bearing half portion is a preassembled unit with the rollers 14 being maintained in their assembly position and prevented from falling out of the retaining rings by the holding action of the side walls of the ring openings 18. All difficulties relative to the proper assembly of the rollers within the outer raceway are thus entirely eliminated so that the bearing is capable of being installed conveniently and in a minimum of time in places having a limited available working space.

In the operation of the bearing a skewing or twisting of the rollers out of their parallel relation is prevented by the retaining rings 16 which are angularly movable relative to each other so as to self align themselves into a position for maintaining the rollers in a parallel relation. The split retaining rings are entirely independent of one another and are connected together only by the individual rollers which they carry, and which are extended at right angles or normal to the planes of the retaining rings. This function of the retaining rings to maintain the rollers in a spaced parallel relation is aided by their assembly relative to the rollers in a manner which reduces to a minimum the forces tending to misalign the rollers.

Thus in the embodiment of the invention illustrated each guideway 19 for a corresponding retaining ring 16 is spaced inwardly from the end or thrust wall 13 of the outer raceway a distance which is equal approximately to one-fourth of the axial length of the outer raceway. This axial length is divided so that the two guideways 19 are each spaced inwardly one-fourth of such length and in turn from each other an amount equal to substantially one-half of such axial length. Each retainer ring 16 is of a width approximately equal to the diameter of each roller 14 to provide as large a bearing surface as possible between the rollers 14 and the bottom of the recess 12. By virtue of this relative arrangement of the retaining rings 16 and rollers 14 the leverage arm through which a misaligning force can operate on a roller is very small and when applied on any one roller is counteracted by the remaining rollers in the retaining rings 16. In other words, a roller 14 can not twist alone without tending to likewise twist all of the remaining rollers because of their connection through the retaining rings 16. The rollers 14, therefore, upon which no misaligning force is applied thus act, through the retaining rings 16, to maintain a roller having a misaligning force applied thereon in a parallel relation. This relative construction and assembly of the rollers and rings thus permits a free rotation of the rollers and has been found to provide for an efficient operation of the bearing at relatively high speeds. Further, since the rollers are always in a parallel relation a minimum of friction occurs at all times of operation so that starting operation is accomplished easily and without danger of the rollers becoming misaligned. It is to be understood of course that the relative dimensions given above for the guideways 19, rings 16, and rollers 14 may be varied depending upon the use to which the bearing is applied.

Along with the provision of means for keeping the rollers free at all times a proper bearing operation depends also on lubricating the rollers so that an oil film is always at the roller bearing surfaces. Where oil is applied continuously to the bearing surfaces, rather than only maintained at the bearing surface, there is less danger of the bearing burning out because the body of the oil, and in turn its lubricating qualities, is retained over a longer period of operation.

In the usual application of a split bearing in a connecting rod it is desirable to have the oil to the bearing fed through the crank shaft or inner raceway into the bearing and then outwardly from the bearing through the outer raceway to the connecting rod and associated wrist pin. Thus referring to Figs. 1 and 6 the axial oil passage 29 in the inner raceway 20 is connected with radially extending oil passages 31 open to the recess 12 in which the rollers 14 are received. The oil thus admitted to the bearing passes about the rollers and into the guideways 19 prior to passing through the oil holes 23 in the outerraceways 10 to the oil groove 32 in the peripheral portions of the outer raceways. The groove 32 is connected with an oil passage 33 in the connecting rod 27 through which oil from the bearing flows to the connecting rod wrist pin (not shown). The oil is thus conducted directly to the bearings, with the guideways 19 constituting oil reservoirs within the outer raceway and serving to increase the oil carrying capacity of the bearing. In the operation of the bearing, therefore, the guidably supported peripheral portions 17 of the retaining rings 16 move in an oil bath.

On angular rotation of the retaining rings the portions 17 have been found to assist in moving or pumping the oil out of the guideways 19 and about the rollers 14. The flow of the oil through the bearing and into the connecting rod is greatly aided by this pumping action of the ring portions 17. Oil is thus continuously applied to the connecting rollers 14 and connecting rod, with more oil being supplied to the rollers at high speeds because of the increased rate of angular movement of the retaining rings at high speeds. Generation of heat in the bearing structure at high speeds is thus appreciably reduced.

This generation of heat is further reduced by the construction of the retaining rings 16 of a bronze or like material. Roller bearings are generally composed of steel and, as is well recognized when they are arranged in bearing engagement with an adjacent steel surface, the friction factor between the two steel bearing surfaces is relatively high. However, the friction factor between bronze and steel is of a lower value so that the difference in the material construction of the rollers 14 and rings 16 reduces the friction generated in the bearing as a whole and in turn increases the speed at which the bearing can be used.

From a consideration of the above description, therefore, it is seen that the invention provides an antifriction bearing of split type which is compact in design and in which the bearing half portions can be completely preassembled so that each half portion is assembled as a complete unit relative to the inner raceway with which it is associated. The rollers are maintained against any twisting movement to prevent any freezing of the bearing at high speeds or during starting operation at which time a relatively high torque is applied to the rollers in the load zone of the bearing. The retaining rings are connected together only by the rollers which they support so as to be angularly movable relative to each other into self aligned positions to maintain the rollers in a parallel relation. The guideways for the retaining rings are of a relatively small width so as not to appreciably reduce the load carrying capacity of the rollers relative to the outer raceway and act as oil reservoirs to increase the oil carrying capacity of the bearing and assure a positive feeding of oil directly to the roller bearing surfaces.

Although the invention has been specifically described with respect to one embodiment thereof it is to be understood that it is not to be so limited since modifications and alterations can be made therein which are within the full intended scope of this invention as defined by the appended claim.

I claim:

A split roller bearing segment comprising a one-piece ring segment having side flanges defining a segment of a raceway therebetween, said ring segment also having grooves spaced axially from one another and each spaced axially inward from the adjacent flange, a retaining ring segment in each of said grooves, said retaining ring segments each having been inserted into its groove through the open face of the bearing segment and having roller retaining openings therein which are disposed outside said raceway, and a plurality of rollers movably retained in spaced apart relationship by said retaining rings, said rollers extending axially of said raceway through corresponding openings of said retaining rings and being engaged by said retaining rings at points spaced inwardly from their ends.

OTTO STORZ.